Sept. 25, 1923.
E. J. BAISDEN
PUMP
Filed Sept. 8, 1922
1,469,140
2 Sheets-Sheet 1
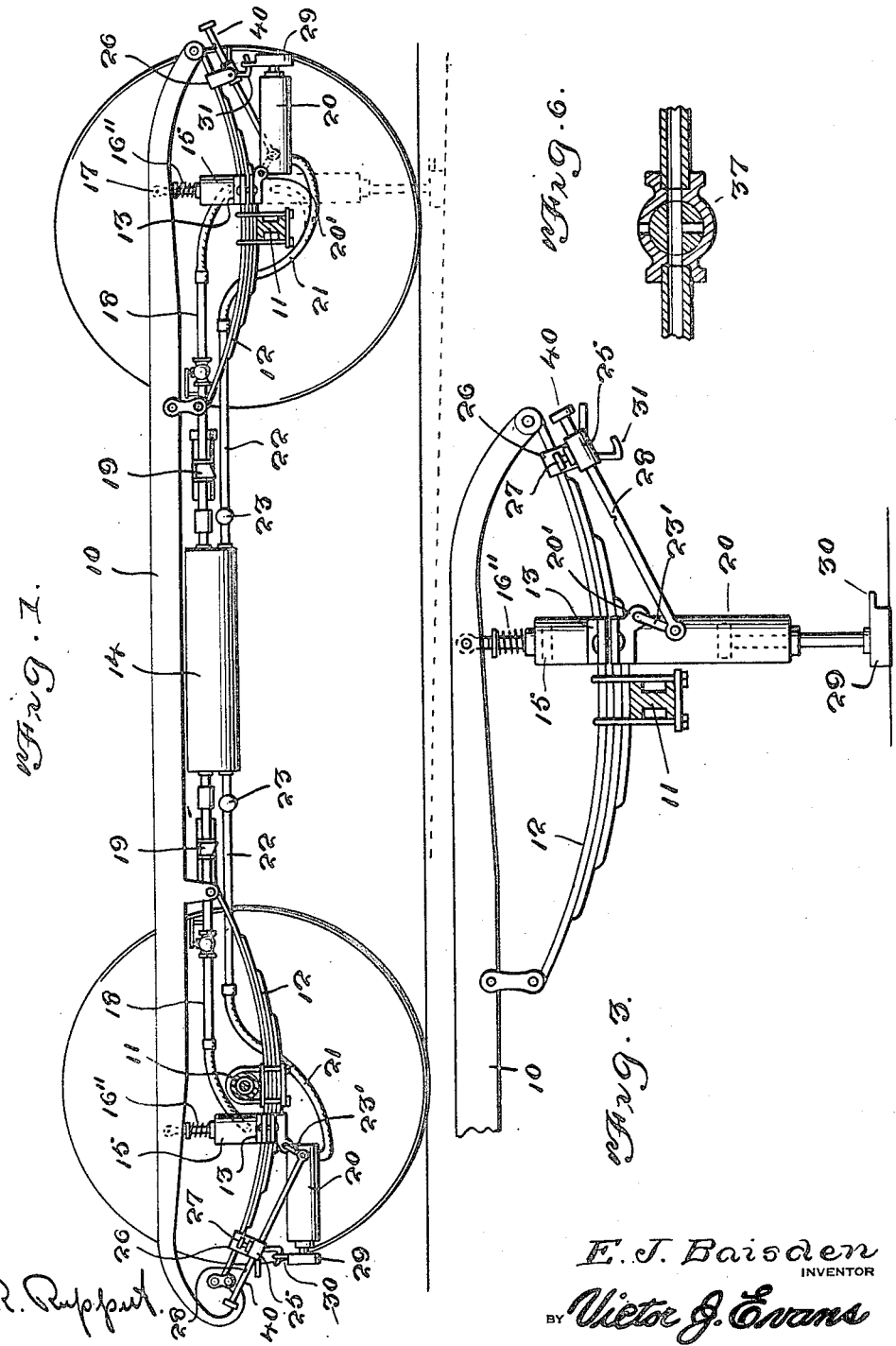

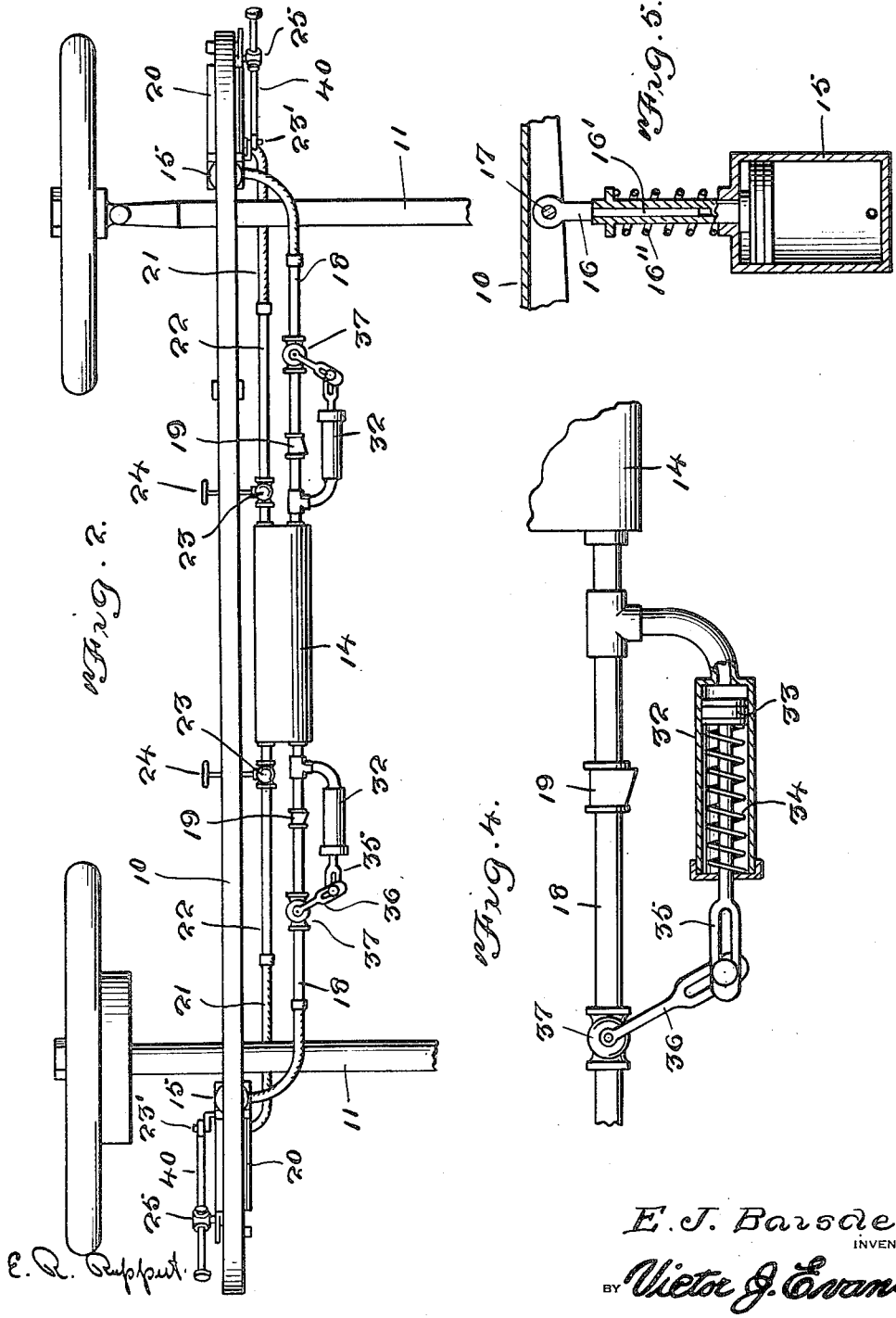

Patented Sept. 25, 1923.

1,469,140

UNITED STATES PATENT OFFICE.

EDWARD J. BAISDEN, OF NEW YORK, N. Y.

PUMP.

Application filed September 8, 1922. Serial No. 586,926.

*To all whom it may concern:*

Be it known that I, EDWARD J. BAISDEN, a citizen of the United States, residing at New York, in the county of New York and State of New York, have invented new and useful Improvements in Pumps, of which the following is a specification.

This invention relates to improvements in air compressors and has for an object the provision of means whereby the action of the springs of an automobile or other vehicle may be utilized for supplying air under pressure to a storage tank for use in inflating pneumatic tires and for other purposes.

Another object of the invention is the provision of means whereby the flow of air from the compressor or pump to the tank will be automatically interrupted when pressure in said tank reaches a predetermined degree and automatically restored, when said pressure drops to a predetermined degree.

With the above and other objects in view, the invention further includes the following novel features and details of construction, to be hereinafter more fully described, illustrated in the accompanying drawings and pointed out in the appended claims.

Figure 1 is an elevation with parts in section of an automobile supplied with my invention.

Figure 2 is a partial plan view.

Figure 3 is an enlarged view showing the arrangement of parts at one end of the automobile.

Figure 4 is a detail view of the regulator.

Figure 5 is a sectional detail view of one of the pumps or compressors.

Figure 6 is a sectional detail view of one of the valves.

Referring in detail to the drawings, wherein like characters of reference denote corresponding parts, the reference character 10 indicates the frame of an automobile or other vehicle, which is supported upon axles 11, by means of springs 12, all of which form no part of the invention and may be of any suitable character or construction.

Mounted upon the frame 10 by means of cross bars or other suitable means is a storage tank or reservoir 14, while secured to the frame 10 and each spring is a plurality of pumps or compressors 15. These compressors may be of any suitable character, such as the piston type as shown. One member of the compressor is secured to the spring while the other or movable member of the compressor is secured to the frame, so that action of the spring will operate the compressor. In the drawings there are four compressors of the piston type shown, the cylinders of which are secured to the springs by clamps 13 while the rods 16 of their pistons are secured to the frame as shown at 17. These cylinders are in communication with the tank 14 by means of pipes 18 and the latter have included therein check valves 19 which act to permit the passage of air from the compressors to the tank but prevent passage of air in an opposite direction.

The action of the springs 12 incident to the travel of the vehicle over ordinary roads, will operate the compressors to force air under pressure into the tank 14, so that a supply of air may be maintained for various uses, such as for the inflation of pneumatic tires, as shown in the drawings. Each compressor is provided with a telescopic piston rod, as shown at 16' and a spring 16" tends to hold the parts with the piston in raised position, as shown in Figure 5.

A jack 20 is hinged at its upper end to the lower part of each clamp 13 and the cylinder of each jack is connected by the flexible tube 21 and the pipe 22 with the tank 14. A three-way valve 23 is arranged in each pipe 22, said valve being operated by any suitable form of handle, as shown at 24. This valve is so arranged that when turned in one direction it will permit air to pass from the storage tank into the jack to actuate the same and when turned in another direction it will close communication to the tank and connect the interior of the jack cylinder with the atmosphere. Thus the vehicle can be easily and quickly jacked up whenever desired. The hinged rod 20' of each jack is provided with a crank 23' to which is connected an operating rod 40 which is slidably supported by a sleeve 25 carried by a bracket 26 which is secured to the spring 12. The rod is provided with a handle and a plunger 27 carried by the sleeve engaging notches 28 acts to hold the jack in its adjusted position. A shoe 29 is connected with the piston rod of the jack and a perforated ear 30 on said shoe is adapted to engage with a hook 31 on the bracket 25 for holding the parts with the piston of the jack in its inner position.

I also provide means for automatically controlling the air pressure within the tank 14. Such means consists of a cylinder 32 which is connected with the pipe leading from tank 14, adjacent the connection of said pipe with said tank, so that the pressure within the tank will act against the piston 33 in the cylinder and when the air pressure overcomes the spring 34, which keeps the piston in its forward position, the rod 35, through means of the link 36, will turn the valve 37 so as to disconnect the tank from the pump or compressor and place the pump in communication with the atmosphere. Thus by using a spring 34 of the proper strength a predetermined amount of pressure can be held in the tank 14 for as soon as the pressure in said tank becomes greater than the strength of the spring the piston 33 will be moved outwardly, thus actuating the valve 37 so as to prevent air from entering the tank and permitting the air from the pump to go to waste. When the pressure in the tank falls the spring will return the parts to normal position so that the compressed air from the pump will flow into the tank.

From the foregoing it will be seen that the action of the springs of the vehicle incident to the travel of the same over roads will operate the compressors and thus force air into the storage tank. When the vehicle is to be jacked up it is simply necessary to swing down the jacks by means of the rods 40 and then open the valves 23 to permit the air from the tank to flow into the cylinders of the jacks and thus raise the wheels of the vehicle off the ground. When the vehicle is to be lowered the valves 23 are moved to another position so as to permit the air from the jack to flow to waste and to prevent the air from the tank to flow into the jack. By making the piston rods of the pumps telescopic there is no danger of injuring the pump parts by undue movement of the body on the chassis. When the jacks are swung upwardly and the shoes placed in engagement with the hooks the parts will be held against movement.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having described the invention what is claimed is:—

1. In a vehicle, an air compressor actuated by the expansion and contraction of the springs of the vehicle, a storage tank, means for connecting the same with the compressor, means controlled by the air pressure within the tank for automatically interrupting the flow of air into the tank when the pressure exceeds a certain degree, a jack hingedly connected with a part of the vehicle, manually operated means for connecting the jack with the compressed air tank and means for normally supporting the jack in raised position with its shoe in retracted position.

2. In a vehicle, an air compressor actuated by the expansion and contraction of the springs of the vehicle, said compressor including a cylinder, a piston therein, a telescopic piston rod and spring means for holding the piston rod in its raised position.

In testimony whereof I affix my signature.

EDWARD J. BAISDEN.